United States Patent
Mamtimin

(10) Patent No.: US 12,474,501 B2
(45) Date of Patent: Nov. 18, 2025

(54) PRISMATIC GRID INVERSION FOR OIL SATURATION AND 3-PHASE HOLDUP

(71) Applicant: Halliburton Energy Services, Inc., Houston, TX (US)

(72) Inventor: Mayir Mamtimin, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 212 days.

(21) Appl. No.: 18/227,628

(22) Filed: Jul. 28, 2023

(65) Prior Publication Data

US 2025/0035810 A1    Jan. 30, 2025

(51) Int. Cl.
*G01V 5/10*    (2006.01)
*E21B 49/08*    (2006.01)

(52) U.S. Cl.
CPC .......... *G01V 5/105* (2013.01); *E21B 49/0875* (2020.05)

(58) Field of Classification Search
CPC .............................. G01V 5/105; E21B 49/0875
See application file for complete search history.

(56) References Cited

U.S. PATENT DOCUMENTS

| | | |
|---|---|---|
| 4,645,926 A | 2/1987 | Randall |
| 5,045,693 A | 9/1991 | McKeon et al. |
| 5,105,080 A | 4/1992 | Stoller et al. |
| 11,320,563 B2 | 5/2022 | Mamtimin et al. |
| 11,378,715 B2 | 7/2022 | Mamtimin et al. |
| 11,493,662 B2 | 11/2022 | Mamtimin et al. |
| 11,624,855 B2 | 4/2023 | Mamtimin et al. |
| 11,635,543 B2 | 4/2023 | Mamtimin et al. |
| 11,681,070 B2 | 6/2023 | Mamtimin et al. |
| 12,276,769 B2 * | 4/2025 | Mamtimin ............. G01V 5/045 |
| 2014/0330520 A1 | 11/2014 | Kwong |
| 2019/0383130 A1 | 12/2019 | Fox et al. |
| 2021/0373193 A1 | 12/2021 | Mamtimin et al. |
| 2021/0373194 A1 | 12/2021 | Mamtimin et al. |
| 2021/0373495 A1 | 12/2021 | De Oliveira et al. |
| 2022/0171086 A1 | 6/2022 | Mamtimin et al. |
| 2022/0171087 A1 | 6/2022 | Mamtimin et al. |
| 2022/0171088 A1 | 6/2022 | Mamtimin et al. |

(Continued)

FOREIGN PATENT DOCUMENTS

| | | | |
|---|---|---|---|
| CN | 115075800 A | 9/2022 | |
| WO | WO-2018125114 A1 * | 7/2018 | .......... E21B 47/005 |

OTHER PUBLICATIONS

International Search Report and Written Opinion for International Patent Application No. PCT/US2023/030069 dated Apr. 18, 2024. PDF file. 10 pages.

*Primary Examiner* — David P Porta
*Assistant Examiner* — Fani Polyzos Boosalis
(74) *Attorney, Agent, or Firm* — Thomas Rooney; C. Tumey Law Group, PLLC

(57) ABSTRACT

A method of determining downhole formation oil saturation and three-phase holdup is described. The method includes lowering a pulsed-neutron logging tool downhole with a near detector and a far detector. The method further includes measuring a carbon to oxygen ratio from the near detector, measuring a carbon to oxygen ratio from the far detector, measuring a ratio of inelastic count rates, and plotting the measured ratios in a prismatic grid. The method further includes visualizing the fluid volumetrics around the pulsed-neutron logging tool.

10 Claims, 5 Drawing Sheets

(56) References Cited

U.S. PATENT DOCUMENTS

| | | |
|---|---|---|
| 2022/0291416 A1 | 9/2022 | Mamtimin et al. |
| 2022/0317330 A1 | 10/2022 | Mamtimin et al. |
| 2022/0319166 A1 | 10/2022 | Mamtimin et al. |
| 2023/0060188 A1 | 3/2023 | Mamtimin et al. |

* cited by examiner

PRISMATIC GRID INVERSION FOR OIL SATURATION AND 3-PHASE HOLDUP

BACKGROUND

During oil and gas exploration, many types of information may be collected and analyzed. The information may be used to determine the quantity and quality of hydrocarbons in a reservoir and to develop or modify strategies for hydrocarbon production. For instance, the information may be used for reservoir evaluation, flow assurance, reservoir stimulation, facility optimization, production enhancement strategies, and reserve estimation. Petrophysical properties of a formation may be utilized as additional information that may further drive strategies for hydrocarbon production. Petrophysical properties may comprise borehole size and casing size, tool position and standoff, borehole fluid content, casing and cement quality, formation lithology, formation porosity, formation oil saturation, and/or holdup.

Generally, a pulsed neutron logging (PNL) tool is used to determine petrophysical properties of a formation. A pulsed neutron logging tool emits neutrons to interact with nuclei of any material to induce gamma radiation. The excited target nucleus relaxes to its ground state by emitting characteristic gamma radiation. Some elements emit gamma rays naturally; others can be bombarded with neutrons to induce gamma ray emissions. Each element produces characteristic gamma rays of specific energies. Further, the number of characteristic gamma rays produced is proportional to the abundance of the element. Naturally occurring and induced gamma rays may be counted and sorted according to energy. This produces a gamma ray spectrum that can be processed, or decoded, to identify the elements and their concentrations.

A pulsed-neutron logging tool may operate and function by utilizing nuclear detectors to measure induced gamma radiation by interaction of high energy neutrons that are emitted from a generator. The high energy neutrons interact with the formation in three ways: elastic neutron-scattering, inelastic neutron scattering, and neutron absorption. In elastic neutron-scattering, the neutron bounces off the bombarded nucleus without exciting it or destabilizing it. With each elastic interaction, the neutron loses energy. Hydrogen, with the mass of its nucleus equal to that of a neutron, is very good at slowing down neutrons. Hence, how efficiently a formation slows down neutrons generally indicates the abundance of hydrogen. Because hydrogen is most abundant in pore fluids, neutron slowdown indicates porosity. In inelastic neutron scattering, the neutron bounces off the nucleus, but excites it into quickly giving off what are called inelastic gamma rays. The measurement of gamma ray energies from inelastic neutron scattering yields the relative concentrations of carbon and oxygen, which are then used to determine water saturation. In neutron absorption, the nucleus absorbs the neutron and becomes excited, typically emitting delayed gamma rays. Neutron absorption, or neutron capture, is most common after a neutron has been slowed by elastic and inelastic interactions to thermal energies of about 0.025 eV. The measurement of capture gamma ray energies is used to estimate the abundances of elements most likely to capture a neutron-silicon, calcium, chlorine, hydrogen, sulfur, iron, titanium, and gadolinium.

Pulsed-neutron logging provides valuable data on the formation's carbon-oxygen ratio (C/O). Inelastic measurement may be used for carbon and oxygen analysis independent of water salinity. This information is crucial for reservoir characterization, hydrocarbon reserve estimation, and production optimization. However, determining borehole holdup content and differentiating it from the oil content in the formation present significant challenges. Pulsed-neutron logging measurement represents a combination of signals originating from both the formation and borehole, making it challenging to isolate the contributions from each. Furthermore, the fluid content encountered can vary between oil, water, and gas, further complicating the analysis.

BRIEF DESCRIPTION OF THE DRAWINGS

These drawings illustrate certain aspects of some examples of the present disclosure and should not be used to limit or define the disclosure.

DETAILED DESCRIPTION

The present disclosure relates to systems and methods for a physics-based comprehensive data visualization and inversion framework for effective analysis and interpretation of fluid volumetric in pulsed-neutron logging. Specifically, the systems and methods of the present disclosure relate to visualization of the pulsed-neutron logging measurement in real-time in flowing wells using a prismatic grid that offer robust solutions to differentiating formation oil content from borehole oil/water/gas content. In some embodiments, methods utilizing a prismatic shape representation coupled with a prismatic grid enable the resolution of complex interactions and accurate identification of fluid components in the borehole as the well starts producing formation fluids for example. By leveraging this new framework, it becomes possible to overcome the complexities involved in fluid characterization in pulsed-neutron logging and achieve reliable interpretation (fluid identification and quantification) around the pulsed-neutron logging tool in real-time in flowing wells. The technique is purely based on physics and removes unnecessary assumptions hence enhancing consistency, accuracy, and efficiency in formation evaluation, particularly in varying borehole holdup conditions, enabling improved reservoir characterization and optimized production strategies.

Pulsed-neutron logging is a widely used technique in oil and gas wells for evaluating formation oil saturation. It involves the use of a pulsed neutron generator to emit high-energy neutrons into the formation and measures the resulting gamma-ray emissions and neutron capture responses, providing valuable data on the formation's carbon to oxygen ratios. This information is crucial for reservoir characterization, hydrocarbon reserve estimation, and production optimization. Carbon to oxygen ratio log may be preferred for fresh water and/or mixed salinity environments.

Figure 1:
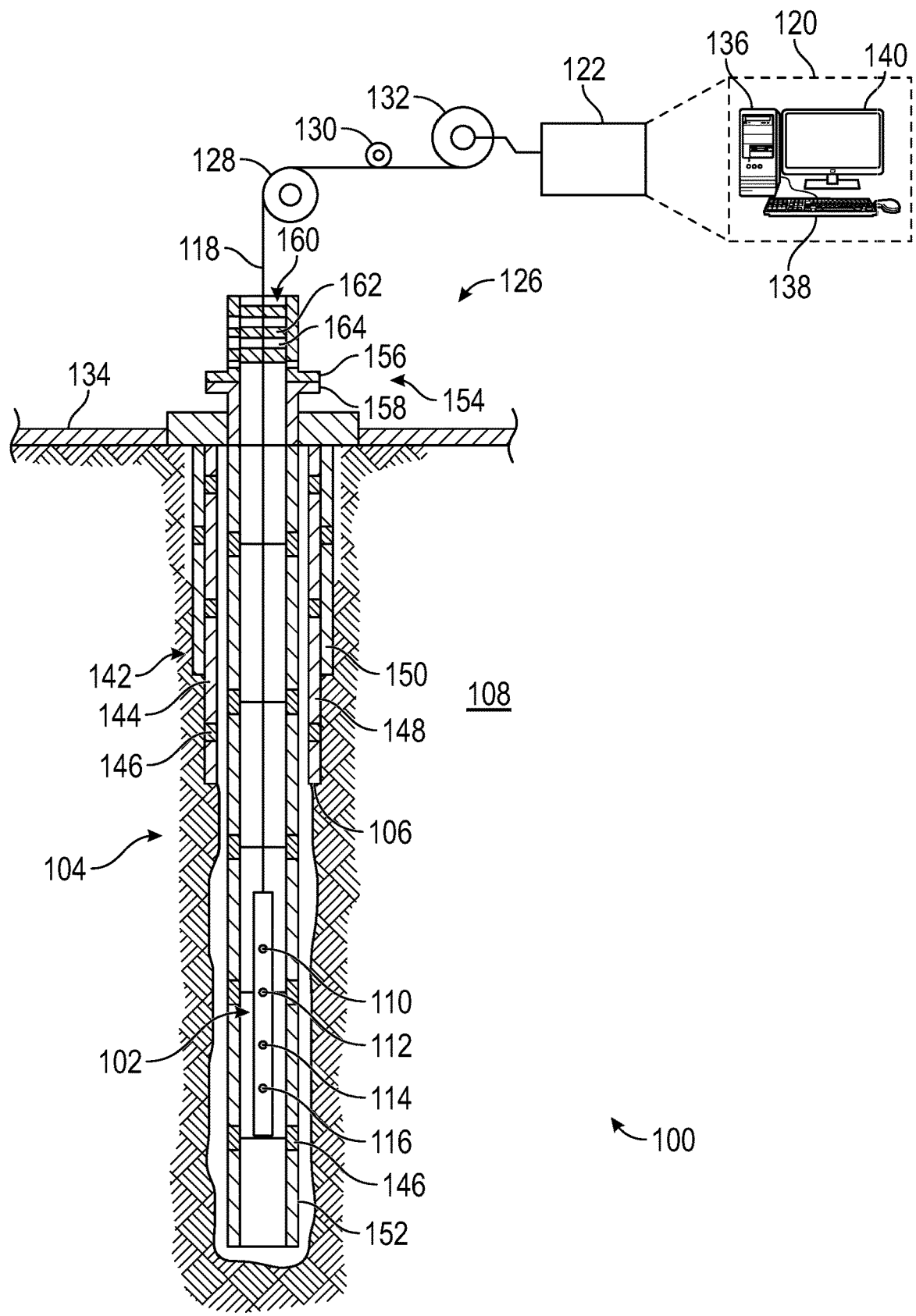
FIG. 1 illustrates a downhole tool in a wireline configuration, in accordance with examples of the present disclosure.

FIG. 1 illustrates logging/measuring operation 100, as disclosed herein, utilizing a pulsed-neutron logging (PNL) tool 102. FIG. 1 illustrates a cross-section of borehole 104 with a pulsed-neutron logging tool 102 traveling through well casing 106. Borehole 104 may traverse through subterranean formation 108 (e.g., hydrocarbon reservoir) as a vertical well and/or a horizontal well. Pulsed-neutron logging tool 102 contains a neutron source 110, a first neutron detector 112 or near detector, a second neutron detector 114 or far detector, and a gamma ray detector 116. Pulsed-neutron logging tool 102 is suspended by a conveyance 118, which communicates power from a logging facility 120 to pulsed-neutron logging tool 102 and communicates telemetry from pulsed-neutron logging tool 102 to computer 122. In examples, pulsed-neutron logging tool 102 may be operatively coupled to a conveyance 118 (e.g., wireline, slickline, coiled tubing, pipe, downhole tractor, and/or the like) which may provide mechanical suspension, as well as electrical connectivity, for pulsed-neutron logging tool 102. Conveyance 118 and pulsed-neutron logging tool 102 may extend within casing string 142 to a desired depth within borehole 104. Conveyance 118, which may include one or more electrical conductors, may exit wellhead 126, may pass around pulley 128, may engage odometer 130, and may be reeled onto winch 132, which may be employed to raise and lower the tool assembly in borehole 104. The position of pulsed-neutron logging tool 102 may be monitored in a number of ways, including an inertial tracker in pulsed-neutron logging tool 102 and a paid-out conveyance length monitor in logging facility 120 (e.g., an idler wheel on the wireline cable). Multiple measurements may be desirable to enable the system to compensate for varying cable tension and cable stretch due to other factors. Computer 122 in logging facility 120 collects telemetry and position measurements and provides position-dependent logs of measurements from pulsed-neutron logging tool 102 and values that may be derived therefrom.

Pulsed-neutron logging tool 102 generally includes multiple instruments for measuring a variety of downhole parameters. Wheels, bow springs, fins, pads, or other centralizing mechanisms may be employed to keep pulsed-neutron logging tool 102 near the borehole axis during measurement operations. During measurement operations, generally, measurements may be performed as pulsed-neutron logging tool 102 is drawn up hole at a constant rate. The parameters and instruments may vary depending on the needs of the measurement operation.

Pulsed-neutron logging tool 102 operates by generating pulses of high energy neutrons that radiate from neutron source 110 into the surrounding environment including borehole 104 and formation 108. The highly energetic neutrons entering the surrounding environment interact with atomic nuclei, inducing gamma radiation. The induced gamma rays may be recorded as a scattering rate (and hence the rate of energy loss) and are generally dominated by the concentration of hydrogen atoms. Induced gamma rays and neutrons may be recorded by first neutron detector 112 or near detector, second neutron detector 114 or far detector, and/or gamma ray detector 116. As the presence of hydrogen is primarily attributable to the presence of water or hydrocarbon fluids, the rate of energy loss and gamma spectrum may yield accurate knowledge of borehole holdup. Accurate knowledge of the borehole holdup determines the accuracy of oil saturation in the formation as well as determining the flow in horizontal production wells.

Measurements taken by pulsed-neutron logging tool 102 may be gathered and/or processed by computer 122. For example, signals recorded by pulsed-neutron logging tool 102 may be sent to computer 122 where they may be stored on memory and then processed. The processing may be performed real-time during data acquisition or after recovery of pulsed-neutron logging tool 102. Processing may alternatively occur downhole on a computer disposed on pulsed-neutron logging tool 102 or may occur both downhole and at surface. In some examples, signals recorded by pulsed-neutron logging tool 102 may be conducted to computer 122 by way of conveyance 118. Computer 122 may process the signals, and the information contained therein may be displayed for an operator to observe and stored for future processing and reference. Computer 122 may also contain an apparatus for supplying control signals and power to pulsed-neutron logging tool 102.

As noted above, systems and methods of the present disclosure may be implemented, at least in part, with computer 122. While shown at surface 134, computer 122 may also be located at another location that is remote from borehole 104. In examples, computer 122 may be disposed on pulsed-neutron logging tool 102, which may allow for processing to occur downhole. Additionally, one or more computers 122 may be utilized during measurement operations. In such examples, a first computer 122 may be at surface 134 and a second computer may be disposed on pulsed-neutron logging tool 102 downhole. Computer 122 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, a computer 122 may be a processing unit 136, a network storage device, or any other suitable device and may vary in size, shape, performance, functionality, and price. Computer 122 may include random access memory (RAM), one or more processing resources such as a central processing unit (CPU) or hardware or software control logic, ROM, and/or other types of nonvolatile memory. Additional components of the computer 122 may include one or more disk drives, one or more network ports for communication with external devices as well as an input device 138 (e.g., keyboard, mouse, etc.) and video display 140. Computer 122 may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 further illustrates a casing string 142 that may extend from wellhead 126 at or above ground level to a selected depth within borehole 104. Casing string 142 may comprise a plurality of joints 144 or segments of casing string 142, each joint 144 being connected to the adjacent segments by a collar 146. There may be any number of layers in casing string 142. For example, a first casing 148 and a second casing 150. It should be noted that there may be any number of casing layers. FIG. 1 also illustrates a pipe string 152, which may be positioned inside of casing string 142 extending part of the distance down borehole 104. Pipe string 152 may be production tubing, tubing string, casing string, or other pipe disposed within casing string 142. Pipe string 152 may comprise concentric pipes. It should be noted that concentric pipes may be connected by collars 146. Pulsed-neutron logging tool 102 may be dimensioned so that it may be lowered into borehole 104 through pipe string 152, thus avoiding the difficulty and expense associated with pulling pipe string 152 out of borehole 104. In examples, cement (not illustrated) may be disposed on the outside of pipe string 152. Cement may further be disposed between pipe string 152 and casing string 142. It should be noted that cement may be disposed between any number of casings, for example between first casing 148 and second casing 150.

In logging systems, such as, for example, logging systems utilizing the pulsed-neutron logging tool 102, a digital telemetry system may be employed, wherein an electrical circuit may be used to both supply power to pulsed-neutron logging tool 102 and to transfer data between computer 122 and pulsed-neutron logging tool 102. A DC voltage may be provided to pulsed-neutron logging tool 102 by a power supply located above ground level, and data may be coupled to the DC power conductor by a baseband current pulse system. Alternatively, pulsed-neutron logging tool 102 may be powered by batteries located within the downhole tool assembly, and/or the data provided by pulsed-neutron logging tool 102 may be stored within the downhole tool assembly, rather than transmitted to the surface during logging.

With continued reference to FIG. 1, wellhead 126 is described. Wellhead 126 allows for entry into borehole 104, such as the placement of pulsed-neutron logging tool 102 into pipe string 152. In examples, wellhead 126 may include a lubricator head 154 and a lubricator head flange 156 which may be coupled to and sealed with lubricator body flange 158. Lubricator head 154 comprises sealing cartridge 160. Sealing cartridge 160 may be removable from lubricator head 154. Sealing cartridge 160 may be a container comprising a plurality of sealing elements 162 and lubricator cavities 164. Sealing elements 162 may comprise, but are not limited to, elastomeric materials, thermoplastic materials, thermosetting materials, composites thereof, or combinations thereof. Sealing elements 162 comprise an inner diameter to allow for pulsed-neutron logging tool 102, conveyance 118, wireline, coiled tubing, and/or the like to be disposed into borehole 104. Sealing elements 162 form a seal around conveyance 118 (or tubing if provided). Sealing elements 162 are selected such that the length of the diameter of the inner diameter is able to sufficiently seal around conveyance 118. In some example methods, a sealing cartridge 160 comprising a plurality of sealing elements 162 of one size may be removed if desired and exchanged for a different sealing cartridge 160 comprising a plurality of sealing elements 162 of a different size if desired. For example, if a wireline operation requires sealing elements 162 of a first size, upon completion of said wireline operation, the sealing cartridge 160 comprising the sealing elements 162 of a first size may be removed from lubricator head 154 and replaced with a second sealing cartridge 160 comprising sealing elements 162 of a second size to perform a subsequent operation, for example a tripping operation.

The carbon to oxygen ratio (C/O) obtained through pulsed-neutron logging plays a critical role in formation saturation analysis using both yields-based ($C/O_{yields}$) and windows-based ($C/O_{windows}$) methods. The $C/O_{yields}$ method is used to determine the carbon and oxygen yields from the measured inelastic spectrum, and their ratio is used to determine oil volume and oil saturation. The $C/O_{yields}$ method provides good accuracy but reduced precision. Advantages of this method are ease of use and interpretation. However, the contribution of carbon to the total spectrum is relatively small. Therefore, good statistics require long measurement times, thus slow logging speeds. To shorten measurement times without sacrificing precision, a windows-based method has been adopted. In window-based methods, the $C/O_{windows}$ is derived from the ratio of count-rates of carbon and oxygen inelastic scattering gammas. Windows are sections of the spectrum most influenced by changes in carbon and oxygen and least influenced by changes in other elements. The ratio of the gamma ray counts from the "carbon window" to counts in the "oxygen window" is then used to determine a more precise saturation. The $C/O_{windows}$ method provides good precision but poor accuracy. It improves the statistics of the measurements because the total counts in the windows are high. However, interpretation is more difficult.

For example, in a clean, water-bearing sand and a water-filled borehole, the $C/O_{yields}$ ratio would be zero, whereas the $C/O_{windows}$ ratio is non-zero. The ratio produced by the windows method must be calibrated with ratios measured under known conditions. Ideally, the tool using the $C/O_{windows}$ would be logged first in a known water-bearing zone to determine a zero carbon value, then logged in a zone of known oil saturation to obtain a second calibration point.

Accurate determination of oil saturation is essential for estimating hydrocarbon reserves and optimizing production strategies, making the C/O a crucial parameter in pulsed-neutron logging for robust and reliable formation evaluation using both window-based and yield-based methods. For instance, C/O obtained through pulsed-neutron logging technique is less affected by formation water salinity. However, the CO ratio obtained through pulsed-neutron logging technique may be affected by formation gas due to the lower atomic density of carbon in gas layer compared with oil layer as the inelastic gamma rays of carbon usually have a poor statistic which is adverse to the evaluation of gas saturation.

The comprehensive visualization of the present disclosure is a conceptual framework rooted in the physics of three-phase fluid volumetrics in both the borehole and the formation and the corresponding signals measured by the pulsed-neutron logging tool. It leverages the idea that each fluid phase can be represented by a distinct dimension within a prismatic grid with carbon to oxygen ratios (CO) and IRIN ratio as coordinates. This prismatic grid approach captures the signal variations and continuous transition between oil, water, and gas phases as the well starts producing formation fluids. The prismatic grid is defined by six boundary conditions, encapsulating the boundary conditions necessary for accurate fluid characterization. By utilizing this comprehensive grid, it becomes possible to gain insights into the complex dynamics of fluid volumetrics, facilitating robust analysis and interpretation in pulsed-neutron logging applications in flowing wells.

The prismatic grid introduces a three-dimensional representation by combining the near CO ratio obtained from the near detector 112, far CO ratio obtained from the far detector 114, and the ratio of inelastic count rates (IRIN) measurements. These parameters are utilized to construct a prismatic shape, which serves as a visualization and interpretation tool. The variations observed in the prismatic grid can be attributed to changes in both the borehole holdup and formation saturation around the pulsed-neutron logging tool 102.

In typical CO measurements, there are near (112) and far detectors (114) that capture the relative ratios of carbon to oxygen. The near detector (112) exhibits greater sensitivity to the borehole fluids, while the far detector (114) is more responsive to the formation fluids. By examining the ratio of the near-to-far total count rate, it becomes possible to analyze the dynamic density variations of the surrounding environment, enabling gas analysis. To facilitate interpretation, these three parameters (near count rate, far count rate, and near-to-far ratio) can be represented as Cartesian coordinates (x, y, z) in a 3D grid. This representation offers a comprehensive visualization and inversion for effective analysis and interpretation of fluid volumetrics in pulsed-neutron well logging.

Assuming the borehole volume can be filled with oil, water, and gas, while the formation pore space can be filled with water and oil, the total borehole fluid volume is accounted for by combining oil, water, and gas, summing up to unity. Similarly, the formation pore volume is represented by the combined oil and water, also summing up to unity. Thus, borehole and formation variation can be represented by three independent variables: oil holdup ($Y_o$), gas holdup ($Y_g$), and oil saturation ($S_o$). In high porosity formations, six data points can be acquired by combining the near-CO-ratio (NCOR), the far-CO-ratio (FCOR), and the ratio of inelastic count rates RIN:

1. (x1, y1, z1) (NCOR, FCOR, RIN)@(Yo=0, So=0, Yg=0)
2. (x2, y2, z2) (NCOR, FCOR, RIN)@(Yo=0, So=1, Yg=0)
3. (x3, y3, z3) (NCOR, FCOR, RIN)@(Yo=1, So=0, Yg=0)
4. (x4, y4, z4) (NCOR, FCOR, RIN)@(Yo=1, So=1, Yg=0)
5. (x5, y5, z5) (NCOR, FCOR, RIN)@(Yo=0, So=0, Yg=1)
6. (x6, y6, z6) (NCOR, FCOR, RIN)@(Yo=0, So=1, Yg=1)

Figure 2:
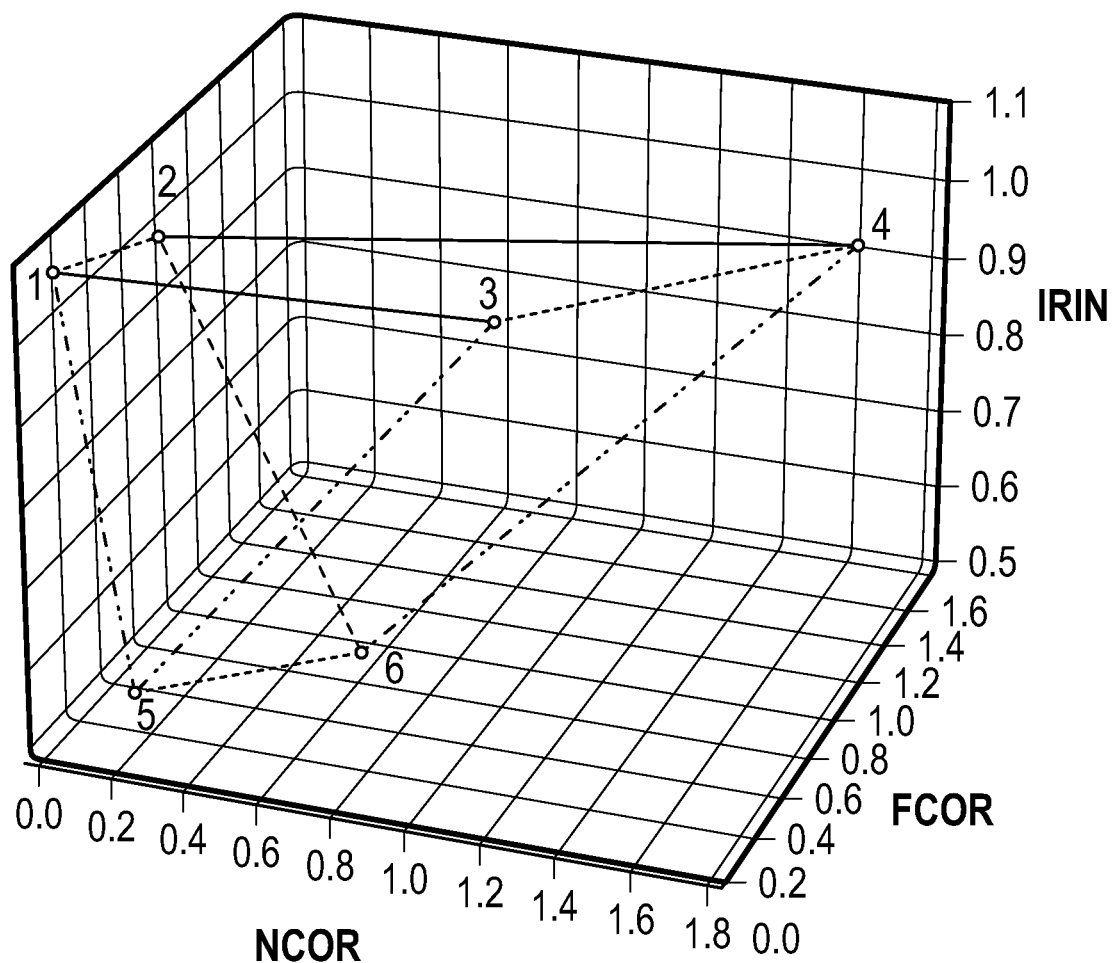
FIG. 2 illustrates embodiments of the boundaries of a 3D prismatic grid in porous formation (example porosity=40 pu), in accordance with examples of the present disclosure.

After adding these six points following their Cartesian coordinates (x, y, z) in a 3D grid, it represents a prismatic shape as shown in FIG. 2. For instance, when gas holdup is zero ($Y_g$=0), the following four data points represent the boundaries of the relative change of the oil holdup ($Y_o$) and the oil saturation ($S_o$):

(x1, y1, z1)=(NCOR, FCOR, RIN)@(Yo=0, So=0, Yg=0)
(x2, y2, z2)=(NCOR, FCOR, RIN)@(Yo=0, So=1, Yg=0)
(x3, y3, z3)=(NCOR, FCOR, RIN)@(Yo=1, So=0, Yg=0)
(x4, y4, z4)=(NCOR, FCOR, RIN)@(Yo=1, So=1, Yg=0)

Specifically, the solid lines represent constant oil saturation ($S_o$=0 or $S_o$=1) with changing oil holdup ($Y_o$ varies from 0 to 1). Specifically, when the oil saturation of the formation is zero ($S_o$=0), the first solid line goes from point 1 ($Y_o$=0, $S_o$=0, $Y_g$=0) to point 3 ($Y_o$=1, $S_o$=0, $Y_g$=0) in FIG. 2. Therefore, the borehole is filled with water at point 1. As water from the borehole is replaced by oil, the point of visualization moves from point 1 along the solid line to point 3, wherein the borehole is filled with only oil. When the oil saturation of the formation is one ($S_o$=1), the second solid line goes from point 2 ($Y_o$=0, $S_o$=1, $Y_g$=0) to point 4 ($Y_o$=1, $S_o$=1, $Y_g$=0) in FIG. 2 with changing oil holdup ($Y_o$ varies from 0 to 1). As water from the borehole is replaced by oil, the point of visualization moves from point 2 (only water in the borehole) along the solid line to point 4, wherein the borehole is filled with only oil.

In contrast, the dotted lines represent constant oil holdup ($Y_o$=0 or $Y_o$=1) with changing oil saturation ($S_o$ varies from 0 to 1). Specifically, when the oil holdup is zero ($Y_o$=0), the first dotted line goes from point 1 ($Y_o$=0, $S_o$=0, $Y_g$=0) to point 2 ($Y_o$=0, $S_o$=1, $Y_g$=0) in FIG. 2. The borehole is filled with water and the oil saturation of the formation is zero at point 1. As oil from the deep formation displaces the other fluid in the formation (whether it is water or gas), the point of visualization moves from point 1 along the dotted line to point 2, wherein the oil saturation of the formation ($S_o$) is 1. The second dotted line in FIG. 2 represents an oil holdup of 1 ($Y_o$=1) with changing oil saturation ($S_o$ varies from 0 to 1) going from point 3 ($Y_o$=1, $S_o$=0, $Y_g$=0) to point 4 ($Y_o$=1, $S_o$=1, $Y_g$=0). The near detector 112 is more sensitive to borehole fluid (NCOR axis) while the far detector 114 is more responsive to oil saturation (FCOR axis). Therefore, the point of visualization moves from point 3 to point 4 as oil from the deep formation displaces the other fluid present initially in the formation while the borehole is filled with oil during the entire measurement.

Therefore, these four points (1, 2, 3, and 4) bound the problem with continuous and incremental change. When gas holdup ($Y_g$) starts to increase, this four-point boundary starts to shrink and eventually collapses to two points (5 and 6) when the gas holdup is equal to 1 ($Y_g$=1):

(x5, y5, z5)=(NCOR, FCOR, RIN)@(Yo=0, So=0, Yg=1)
(x6, y6, z6)=(NCOR, FCOR, RIN)@(Yo=0, So=1, Yg=1)

Therefore, the dash-dotted line represents the varying gas holdup ($Y_g$) with constant oil saturation ($S_o$). When gas holdup ($Y_g$) increases from 0 to 1, the solid line collapses to a single point as the borehole oil content is being replaced by the gas volume. As a result, when gas holdup ($Y_g$) is 1, the only variation comes from the formation oil saturation ($S_o$). The resulting shape resembles a prism and hence the name prismatic grid.

Figure 3:
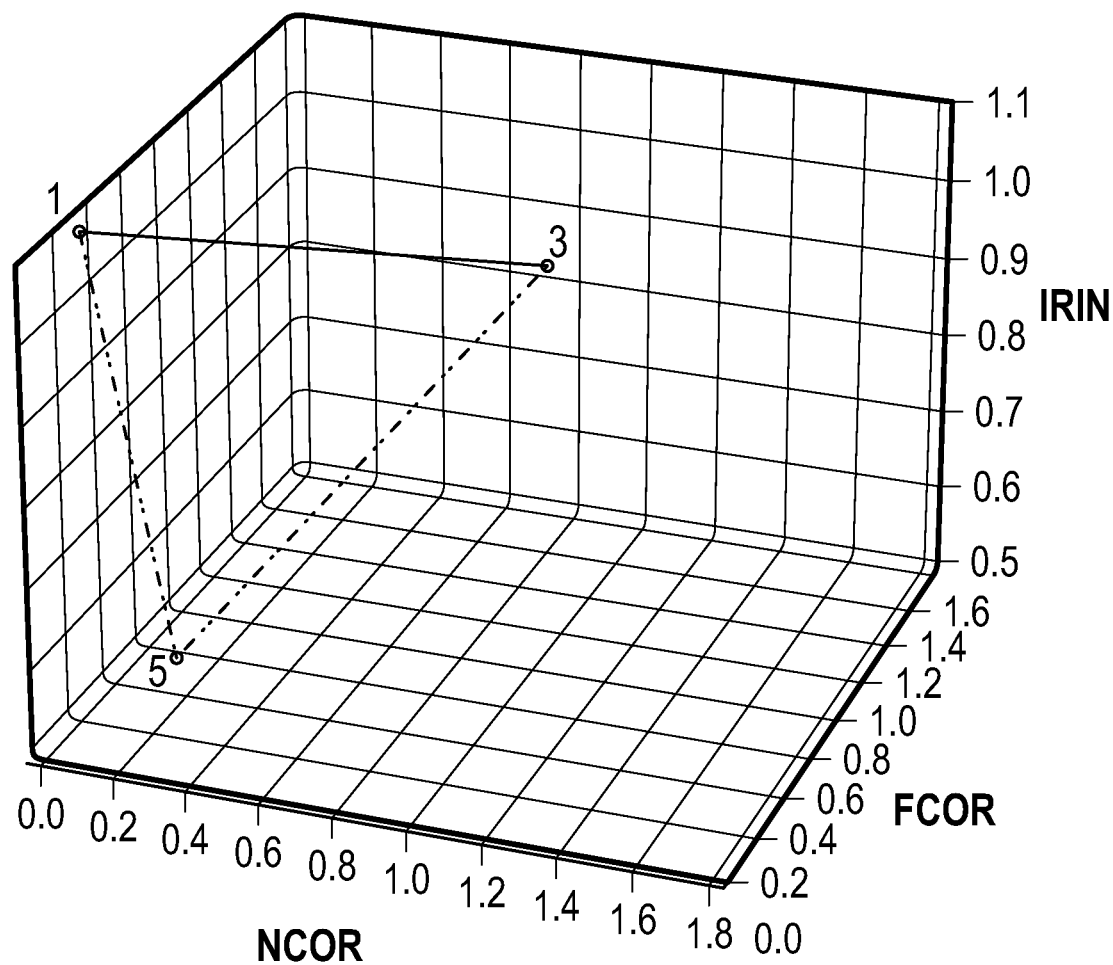
FIG. 3 illustrates embodiments of the boundaries of a 3D prismatic grid wherein tight formation (example porosity=0 pu), in accordance with examples of the present disclosure.

For low porosity formation (i.e. porosity=0), the prismatic shape collapses into a simple triangle represented by points 1, 3, 5 wherein the third dimension caused by the formation oil saturation ($S_o$) collapses as illustrated in FIG. 3. For instance, when gas holdup is zero ($Y_g$=0), the dotted line of FIG. 2 collapses to a single point in FIG. 3 leaving only the oil holdup ($Y_o$) variation (solid line from point 1 to point 3) as formation oil saturation ($S_o$) doesn't make any difference. When gas holdup ($Y_g$) increases, the solid line also collapses to a single point 5 as well. By utilizing the prismatic grid as comprehensive visualization tool, variations in borehole fluid holdup ($Y_o$ and $Y_g$) and formation saturation can be effectively bounded and analyzed. This prismatic grid can be used as a powerful tool for capturing and visualizing the complex relationships between the different fluid phases around the pulsed-neutron logging tool in real-time. Leveraging this framework, it becomes possible to construct a prismatic grid and create an inversion matrix to accurately determine borehole holdup and oil saturation from any pulsed-neutron logging tool measurement in flowing wells.

Figure 4:
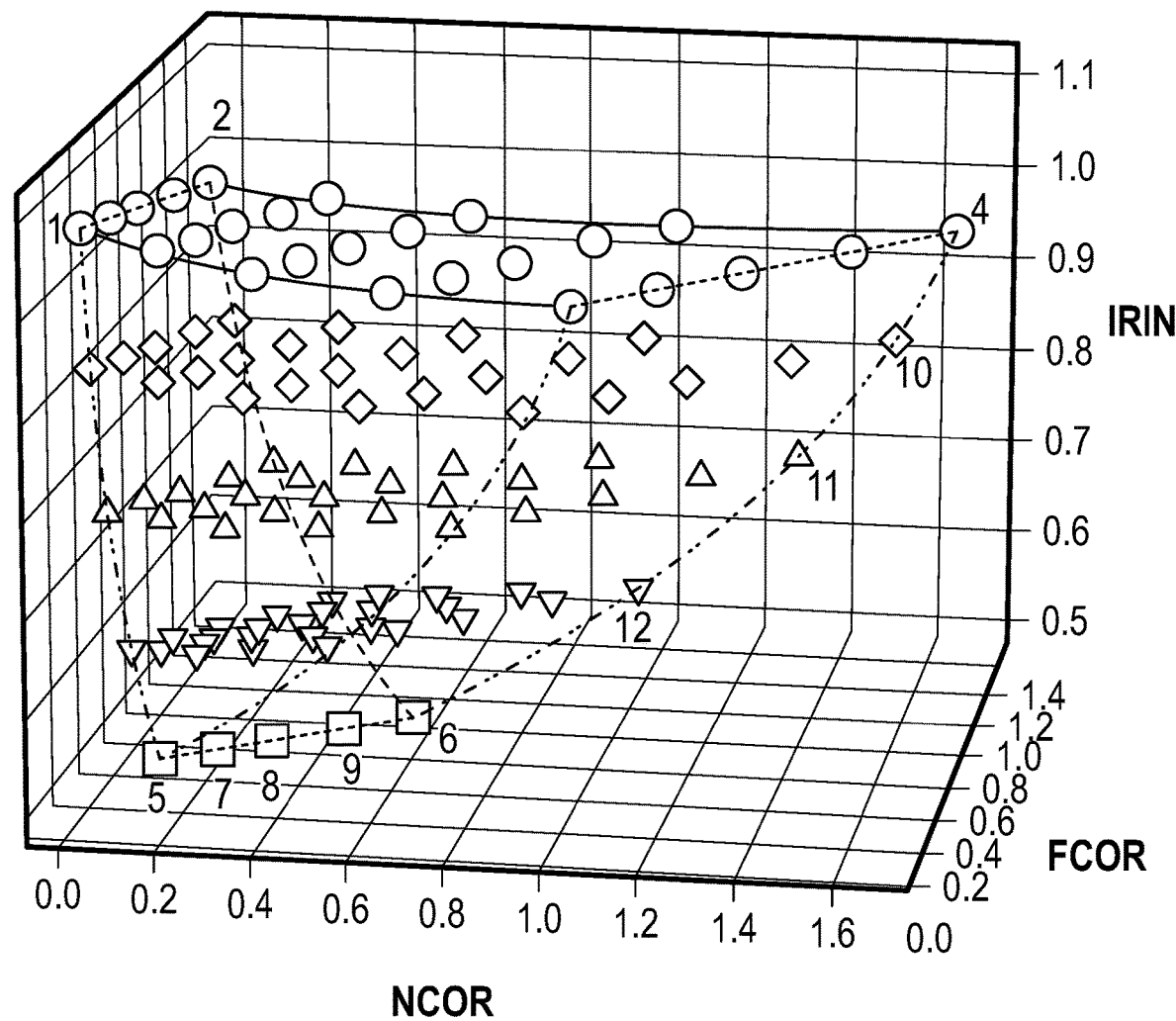
FIG. 4 illustrates embodiments of a 3D prismatic grid as the oil holdup ($Y_o$), the gas holdup ($Y_g$), and the oil saturation ($S_o$) each varies from 0 to 1 with 25% step-size, in accordance with examples of the present disclosure.

For instance, FIG. 4 illustrates embodiments of a 3D prismatic grid as the oil holdup ($Y_o$), the gas holdup ($Y_g$), and the oil saturation ($S_o$) each varies from 0 to 1 with 25% step-size change in each dimension from left to right and from top to bottom. For the sake of clarity of FIG. 4, only few points on the graph will be described. Specifically, from point 5 ($Y_o$=0, $S_o$=0, $Y_g$=1) to point 6 ($Y_o$=0, $S_o$=1, $Y_g$=1)

on the dotted line, point 7 has an oil holdup of zero ($Y_o=0$), a gas holdup of 1 ($Y_g=1$), but an oil saturation of 25% ($S_o=0.25$); point 8 has an oil holdup of zero ($Y_o=0$), a gas holdup of 1 ($Y_g=1$), but an oil saturation of 50% ($S_o=0.5$); and point 9 has an oil holdup of zero ($Y_o=0$), a gas holdup of 1 ($Y_g=1$), but an oil saturation of 75% ($S_o=0.75$). A step-size of 25% from point 4 ($Y_o=1$, $S_o=1$, $Y_g=0$) to point 6 ($Y_o=0$, $S_o=1$, $Y_g=1$) on the dash-dotted line gives point 10, which has an oil holdup of 75% ($Y_o=0.75$), an oil saturation of 100% ($S_o=1$), and a gas holdup of 25% ($Y_g=0.25$), point 11, which has an oil holdup of 50% ($Y_o=0.5$), an oil saturation of 100% ($S_o=1$), and a gas holdup of 50% ($Y_g=0.5$), and point 12, which has an oil holdup of 25% ($Y_o=0.25$), an oil saturation of 100% ($S_o=1$), and a gas holdup of 75% ($Y_g=0.75$).

Figure 5:
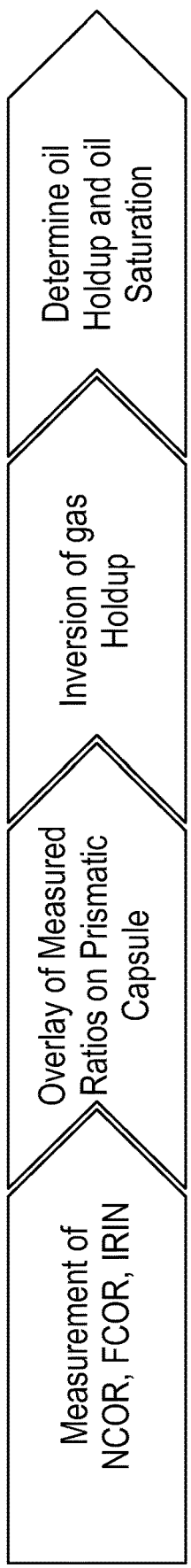
FIG. 5 illustrates an embodiment of a workflow to determine oil holdup and oil saturation, in accordance with examples of the present disclosure.

FIG. 5 illustrates an embodiment of a workflow to determine oil holdup and oil saturation, in accordance with examples of the present disclosure. First, measurements of the CO ratio obtained from the near detector (NCOR) (112 in FIG. 1), the far CO ratio obtained from the far detector 114 (FCOR), and the ratio of inelastic count rates (IRIN) are performed. Then, the measured ratios are plotted in the prismatic grid. As the near detector 112 (NCOR) exhibits greater sensitivity to borehole fluids, while the far detector 114 (FCOR) is more responsive to the formation fluids, by examining the ratio of the near-to-far total count rate, it becomes possible to analyze the dynamic density variations of the surrounding environment, enabling gas analysis (inversion of gas holdup, $Y_g$), and determination of oil holdup ($Y_o$) and oil saturation ($S_o$). The prismatic grid serves as a visualization and interpretation tool. The variations observed in the prismatic grid can be attributed to changes in both the borehole holdup and formation saturation around the pulsed-neutron logging tool (102 in FIG. 1).

The prismatic grid inversion process involves using an algorithm to determine the values of a pulsed-neutron logging measured CO ratios and the ratio of inelastic count rates (IRIN) values at specific points within given boundary conditions of the prismatic grid. Within the prismatic grid, the transition between each point is governed by the physics and the pulsed-neutron logging tool configuration. After a transition function is determined, an interpolation function is generated. By using this interpolation function, the algorithm inverts desired petrophysical properties such as saturation and borehole holdup within the specified range. The accuracy of the inversion results depends on the quality and density of the known boundary conditions and the chosen interpolation technique.

Accordingly, the techniques as described herein result in the determination of the formation oil saturation and 3-phase holdup that can be used for various borehole and formation saturation conditions, enhancing the reliability and robustness of formation evaluation in oil and gas wells. The systems and methods may include any of the various features disclosed herein, including one or more of the following statements.

Statement 1. A method comprising: lowering a pulsed-neutron logging tool downhole comprising a near detector and a far detector; measuring a carbon to oxygen ratio from the near detector; measuring a carbon to oxygen ratio from the far detector; measuring a ratio of inelastic count rates; and plotting the measured ratios in a prismatic grid.

Statement 2. The method of Statement 1, wherein the prismatic grid has Cartesian coordinates.

Statement 3. The method of Statement 1 or Statement 2, further creating an inversion matrix to determine borehole holdup and oil saturation.

Statement 4. The method of any one of Statements 1-3, further determining the formation oil saturation and three-phase holdup.

Statement 5. The method of any one of Statements 1-4, further visualizing fluid volumetrics around the pulsed-neutron logging tool in real time.

Statement 6. The method of any one of Statements 1-5, further analyzing the dynamic density variations of the surrounding environment.

Statement 7. The method of any one of Statements 1-6, further interpreting borehole and formation variations through representation of oil holdup ($Y_o$), gas holdup ($Y_g$), and oil saturation ($S_o$).

Statement 8. The method of any one of Statements 1-7, further representing boundaries of the relative change of the formation oil saturation ($S_o$) and the oil holdup ($Y_o$).

Statement 9. A system for visualizing fluid volumetrics around a pulsed neutron logging tool comprising: a pulsed-neutron logging tool comprising a near detector and a far detector; and a prismatic grid with Cartesian coordinates, wherein one coordinate corresponds to the carbon to oxygen ratio from the near detector, another coordinate corresponding carbon to oxygen ratio from the far detector, and a third coordinate corresponding to the ratio of inelastic count rates.

Statement 10. A system for visualizing boundaries of the relative change of the formation oil saturation ($S_o$) and the oil holdup ($Y_o$) around a pulsed neutron logging tool comprising: a pulsed-neutron logging tool comprising a near detector and a far detector; and a prismatic grid with Cartesian coordinates, wherein one coordinate corresponds to the carbon to oxygen ratio from the near detector, another coordinate corresponding carbon to oxygen ratio from the far detector, and a third coordinate corresponding to the ratio of inelastic count rates.

Although the present disclosure and its advantages have been described in detail, it should be understood that various changes, substitutions, and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
   lowering a pulsed-neutron logging tool downhole comprising a near detector and a far detector;
   measuring a carbon to oxygen ratio from the near detector;
   measuring a carbon to oxygen ratio from the far detector;
   measuring a ratio of inelastic count rates, wherein the ratio of inelastic count rates is a ratio of near detector inelastic count rates to far detector inelastic count rates; and
   plotting the measured ratios in a prismatic grid.

2. The method of claim 1, wherein the prismatic grid has Cartesian coordinates.

3. The method of claim 1, further creating an inversion matrix to determine borehole holdup and oil saturation.

4. The method of claim 1, further determining a formation oil saturation and three-phase holdup.

5. The method of claim 1, further visualizing fluid volumetrics around the pulsed-neutron logging tool in real time.

6. The method of claim 5, further interpreting borehole and formation variations through representation of oil holdup ($Y_o$), gas holdup ($Y_g$), and oil saturation ($S_o$).

7. The method of claim 1, further analyzing dynamic density variations of the surrounding environment of the pulsed-neutron logging tool.

8. The method of claim 1, further representing boundaries of a relative change of a formation oil saturation ($S_o$) and an oil holdup ($Y_o$).

9. A system for visualizing fluid volumetrics around a pulsed neutron logging tool comprising:
   a pulsed-neutron logging tool comprising a near detector and a far detector; and
   a prismatic grid with Cartesian coordinates, wherein one coordinate corresponds to a carbon to oxygen ratio from the near detector, another coordinate corresponds to a carbon to oxygen ratio from the far detector, and a third coordinate corresponds to a ratio of inelastic count rates, wherein the ratio of inelastic count rates is a ratio of near detector inelastic count rates to far detector inelastic count rates.

10. A system for visualizing boundaries of a relative change of a formation oil saturation ($S_o$) and an oil holdup ($Y_o$) around a pulsed neutron logging tool comprising:
    a pulsed-neutron logging tool comprising a near detector and a far detector; and
    a prismatic grid with Cartesian coordinates, wherein one coordinate corresponds to a carbon to oxygen ratio from the near detector, another coordinate corresponds to a carbon to oxygen ratio from the far detector, and a third coordinate corresponds to a ratio of inelastic count rates, wherein the ratio of inelastic count rates is a ratio of near detector inelastic count rates to far detector inelastic count rates.

* * * * *